United States Patent
Liang et al.

(10) Patent No.: US 12,411,557 B2
(45) Date of Patent: Sep. 9, 2025

(54) INTEGRATED CIRCUIT CHIP WITH DATA LINE, KEY AND MECHANICAL KEYBOARD

(71) Applicant: Shenzhen Xinheyun Electronic Technology Co., LTD, Guangdong (CN)

(72) Inventors: Xingwei Liang, Guangdong (CN); Yuangong Sa, Guangdong (CN)

(73) Assignee: Shenzhen Xinheyun Electronic Technology Co., LTD, Shenzhen (CN)

( * ) Notice: Subject to any disclaimer, the term of this patent is extended or adjusted under 35 U.S.C. 154(b) by 0 days.

(21) Appl. No.: 18/858,340

(22) PCT Filed: Dec. 19, 2023

(86) PCT No.: PCT/CN2023/139910
§ 371 (c)(1),
(2) Date: Oct. 21, 2024

(87) PCT Pub. No.: WO2025/043975
PCT Pub. Date: Mar. 6, 2025

(65) Prior Publication Data
US 2025/0258551 A1 Aug. 14, 2025

(30) Foreign Application Priority Data

Aug. 27, 2023 (CN) .......................... 202311082257.1
Sep. 21, 2023 (CN) .......................... 202311224586.5

(51) Int. Cl.
*G06F 3/023* (2006.01)
(52) U.S. Cl.
CPC .................... *G06F 3/023* (2013.01)

(58) Field of Classification Search
CPC ...................................................... G06F 3/023
See application file for complete search history.

(56) References Cited

U.S. PATENT DOCUMENTS

| 10,528,074 B1 * | 1/2020 | Olsson ................. G06F 3/0338 |
| 2010/0079138 A1 * | 4/2010 | David ................... G01R 33/07 324/251 |

FOREIGN PATENT DOCUMENTS

| CN | 109615839 A | 4/2019 |
| CN | 110850995 A * | 2/2020 |

(Continued)

OTHER PUBLICATIONS

International Search Report of PCT Patent Application No. PCT/CN2023/139910 issued on May 11, 2024.

(Continued)

*Primary Examiner* — Amit Chatly (57) ABSTRACT

The present disclosure discloses an integrated circuit chip with data line, a key, and a mechanical keyboard. The integrated circuit chip integrates a magnetic induction integrated circuit and a RGB color driving circuit. The integrated circuit chip includes a power supply pin, a ground pin, a data information input pin, and a data information output pin. The data information input pins and the data information output pins of several integrated circuit chips are connected to form a data line, which is then connected to a MCU. Each integrated circuit chip cooperates with a key with a magnetic element to obtain key information. According to different communication protocols, the RGB color driving circuit and the magnetic induction integrated circuit share the data line to transmit RGB color grayscale information and the key information in a time-sharing manner.

17 Claims, 5 Drawing Sheets

(56) References Cited

FOREIGN PATENT DOCUMENTS

| | | |
|---|---|---|
| CN | 113223444 A | 8/2021 |
| JP | 2013157436 A | 8/2013 |

OTHER PUBLICATIONS

Written opinion of PCT Patent Application No. PCT/CN2023/139910 issued on May 11, 2024.

* cited by examiner

INTEGRATED CIRCUIT CHIP WITH DATA LINE, KEY AND MECHANICAL KEYBOARD

FIELD

The present disclosure relates to the field of mechanical keyboards, and more particularly, to an integrated circuit chip with data line, a key, and a mechanical keyboard.

BACKGROUND

Several keys of the existing mechanical keyboard are independent of each other, and input and output pins of each key are directly electrically connected to a MCU. This wiring method is configured for hundreds of keys on the keyboard, making a PCB layout of the keyboard becomes a problem. Especially for the sake of aesthetics, the mechanical keyboard is often configured with LED lights for each key, which directly doubles the number of wiring and components, and leads to a tight PCB layout and a complex circuit structure. This places high requirements on the design of the circuit; at the same time, as the circuit becomes more complex, an operational stability of the circuit decreases.

SUMMARY

The purpose of the present disclosure is to provide an integrated circuit chip with data line to overcome the shortcomings and deficiencies of the existing keyboards.

An integrated circuit chip with data line, wherein the integrated circuit chip comprises a magnetic induction integrated circuit and a RGB color driving circuit;
  the integrated circuit chip includes a power supply pin, a ground pin, a data information input pin, and a data information output pin; the power supply pin is configured to supply power to the integrated circuit chip, and the ground pin is configured for signal grounding and power grounding; the data information output pin is connected to the data information input pin of an adjacent next integrated circuit chip, and the data information input pin is connected to the data information output pin of an adjacent previous integrated circuit chip; the data information input pins and the data information output pins of several integrated circuit chips are connected to form a data line; the several integrated circuit chips are connected in cascade and the cascaded integrated circuit chips are connected to a MCU; each of the integrated circuit chips cooperates with a corresponding key with a magnetic element to obtain key information; according to different communication protocols, the RGB color driving circuit and the magnetic induction integrated circuit share the data line to transmit RGB color grayscale information and the key information in a time-sharing manner.

An integrated circuit chip with data line, wherein the integrated circuit chip includes a magnetic induction integrated circuit and a RGB color driving circuit;
  the integrated circuit chip includes a power supply pin, a ground pin, a first data information input pin, a first data information output pin, a second data information input pin, and a second data information output pin; the power supply pin is configured to supply power to the integrated circuit chip, and the ground pin is configured for signal grounding and power grounding; the first data information output pin is connected to the first data information input pin of an adjacent next integrated circuit chip, and the first data information input pin is connected to the first data information output pin of an adjacent previous integrated circuit chip; a connection relationship between the second data information input pin and the second data information output pin is similar to that between the first data information input pin and the first data information output pin; the first data information input pins and the first data information output pins of several integrated circuit chips are connected to form a first data line; the second data information input pins and the second data information output pins of the several integrated circuit chips are connected to form a second data line; the several integrated circuit chips are connected in cascade and the cascaded integrated circuit chips are connected to a MCU; each of the integrated circuit chips cooperates with a corresponding key with a magnetic element to obtain key information, and according to different communication protocols, several pieces of the key information are transmitted through the first data line, and RGB color grayscale information is transmitted through the second data line of the RGB color driving circuit.

An integrated circuit chip with data line, wherein the integrated circuit chip includes a magnetic induction integrated circuit chip and a RGB color driving circuit chip;
  the magnetic induction integrated circuit chip includes a power supply pin, a ground pin, a first data information input pin, and a first data information output pin; the power supply pin is configured to supply power to the magnetic induction integrated circuit chip, and the ground pin is configured for signal grounding and power grounding; the data information output pin is connected to the data information input pin of an adjacent next magnetic induction integrated circuit chip, and the data information input pin is connected to the data information output pin of an adjacent previous magnetic induction integrated circuit chip; the data information input pins and the data information output pins of several integrated circuit chips are connected to form a first data line; the several magnetic induction integrated circuit chips are connected in cascade and the cascaded magnetic induction integrated circuit chips are connected to a MCU; each of the magnetic induction integrated circuit chips cooperates with a key with a magnetic element to obtain key information; and several pieces of the key information are transmitted through the first data line according to different communication protocols;
  the RGB color driving circuit chip shares the power supply pin and the ground pin of the magnetic induction integrated circuit chip; the RGB color driving circuit chip further includes a second data information input pin and a second data information output pin, and a connection relationship between the second data information input pin and the second data information output pin is similar to that between the first data information input pin and the first data information output pin.

An integrated circuit chip with data line, wherein the integrated circuit chip is a magnetic induction integrated circuit chip, and the magnetic induction integrated circuit chip includes a power supply pin, a ground pin, a data information input pin, and a data information output pin; the power supply pin is configured to supply power to the magnetic induction integrated circuit chip, and the ground pin is configured for signal grounding and power grounding; the data information output pin is connected to the data information input pin of an adjacent next magnetic induction integrated circuit chip, and the data information input pin is connected to the data information output pin of an adjacent previous magnetic induction integrated circuit chip; several magnetic induction integrated circuit chips are connected in cascade and the cascaded magnetic induction integrated circuit chips are connected to a MCU; the data information input pins and data information output pins of the several integrated circuit chips are connected to form a data line; each of the magnetic induction integrated circuit chips cooperates with a corresponding key with a magnetic element to obtain key information, and several pieces of the key information are transmitted through the data line according to different communication protocols.

In some embodiments, a single piece of key information is transmitted bit by bit, and n keys of an entire keyboard correspond to n bits of information; the n bits of information and reset information form a period of the key information; a working frequency of each magnetic induction integrated circuit chip is adjusted according to a period during which the MCU reads all the key information.

In some embodiments, the MCU sends a n-bit code corresponding to n magnetic induction integrated circuit chips at one time, and the n-bit code passes through the n keys in turn;

each key corresponds to a bit of the n-bit code, and each bit corresponds to a unipolar return-to-zero code, and an initial code in a "0" state of the key is set to be high level in a whole period and be not greater than a first set value; when the n-bit code passes through a key and the key is not pressed, a placeholder code of the key is adjusted to be in a "0" state which is high level in the whole period and is not greater than a second set value and greater than the first set value; when the key is pressed, the placeholder code of the key is adjusted to be in a "1" state, which is high level in the whole period and is greater than a third set value, and the third set value is greater than the second set value;

or, after the MCU sends a reset code, the several pieces of the key information are transmitted in an accumulative manner until the several pieces of the key information is transmitted to the MCU.

In some embodiments, a single piece of the key information is transmitted in one byte, and the single piece of the key information includes x bits of synchronization information, y bits of working frequency information of the magnetic induction integrated circuit chip, and z bits of key voltage information; a sum of x bits, y bits, and z bits is one byte; the key voltage information is continuous voltage information or digital voltage values;

n keys of an entire keyboard correspond to n bytes of information, and the n bytes of information and the reset information form a period of the key information.

In some embodiments, after the MCU sends a reset code, several pieces of the key information are transmitted in an accumulation manner until the several pieces of the key information are transmitted to the MCU;

or, the MCU sends out a n-byte code corresponding to n magnetic induction integrated circuit chips at a time, and the n-byte code passes through the n keys in turn; each key corresponds to a byte, and each bit in the byte corresponds to a unipolar return-to-zero code.

In some embodiments, the integrated circuit chip includes one or two of the power supply pins.

In some embodiments, the integrated circuit chip is provided with a backup data line transmission channel.

The present disclosure further provides a key, including a key body, the key body including an upper shell, a lower shell fixedly connected to the upper shell, and a press handle being arranged on the upper shell and being moveable up and down, a receiving space being formed between the upper shell and the lower shell, an elastic element being arranged in the receiving space, the elastic element being located below the press handle, wherein the key further includes a magnetic element and a magnetic induction element, the magnetic element is fixed on the press handle and moves up and down with the press handle, the magnetic induction element includes any one of the above integrated circuit chip with data line, the magnetic induction element is arranged on a printed circuit board, and the magnetic element is arranged correspondingly to the magnetic induction element.

The present disclosure further provides a mechanical keyboard, including a printed circuit board, a single-chip microcomputer being arranged on the printed circuit board, and a plurality of the above keys.

Compared with the prior art, the present disclosure has the following advantages and beneficial effects:

Firstly, the keys of the present disclosure are connected together through one or two data lines, and then the keys are connected to the MCU. The above connection method can save a lot of wiring space and reduce the difficulty of PCB design. At the same time, on the basis that the keys are connected through the data line, the present disclosure provides several different code transmission methods and working modes, which changes the independent states of the keys of the existing mechanical keyboard.

Secondly, in the present disclosure, the magnetic induction integrated circuit and the RGB color driving circuit are integrated on a single chip, or the magnetic induction integrated circuit chip and the RGB color driving circuit chip are physically packaged together, reducing at least half of the number of the components.

Correspondingly, the number of the pins used for the MCU to drive the RGB chip and to perform the key detection has been reduced from dozens to one or two (depending on the number of the data lines).

BRIEF DESCRIPTION OF THE DRAWINGS

To describe the technical solutions in the embodiments of the present disclosure more clearly, the following briefly introduces the accompanying drawings required for describing the embodiments or the prior art. Apparently, the accompanying drawings in the following description show merely some embodiments of the present disclosure, and persons of ordinary skill in the art may still derive other drawings from these accompanying drawings without creative efforts.

DETAILED DESCRIPTION

In order to make the objectives, features, and advantages of the present disclosure more obvious and understandable, the technical solutions in the embodiments of the present disclosure will be clearly and completely described below in conjunction with the accompanying drawings of the embodiments of the present disclosure. It is apparent that the embodiments described below are only a part of the embodiments of the present disclosure, not all of them. Based on the embodiments of the present disclosure, all other embodiments obtained by those skilled in the art without creative effort fall within the scope of protection of the present disclosure.

Embodiment 1

The present disclosure provides an integrated circuit chip with data line. The integrated circuit chip includes a magnetic induction integrated circuit chip, which includes a power supply pin, a ground pin, a data information input pin, and a data information output pin. The power supply pin is configured to supply power to the magnetic induction integrated circuit chip, and the ground pin is configured for signal grounding and power grounding. The data information output pin of the magnetic induction integrated circuit chip is connected to a data information input pin of an adjacent next magnetic induction integrated circuit chip, and the data information input pin of the magnetic induction integrated circuit chip is connected to the data information output pin of an adjacent previous magnetic induction integrated circuit chip. Several magnetic induction integrated circuit chips are connected in cascade and the cascaded magnetic induction integrated circuit chips are then connected to a MCU. The data information input pins and the data information output pins of the several integrated circuit chips are connected to form a data line. Each magnetic induction integrated circuit chip cooperates with a corresponding key with a magnetic element to obtain key information.

In this embodiment, the integrated circuit chip only includes one magnetic induction integrated circuit chip, and a code transmission method of the magnetic induction integrated circuit chip adopts a single-key bit accumulation method.

The information of a single key is transmitted bit by bit, and n keys of the entire keyboard correspond to n bits of information. The n bits of information and reset information form a period of the key information. a working frequency of each magnetic induction integrated circuit chip is adjusted according to the period during which the MCU reads all the key information.

The following explanation is based on three keys as an example. The same principle applies to multiple keys, which is not repeated hereinafter.

Figure 1:
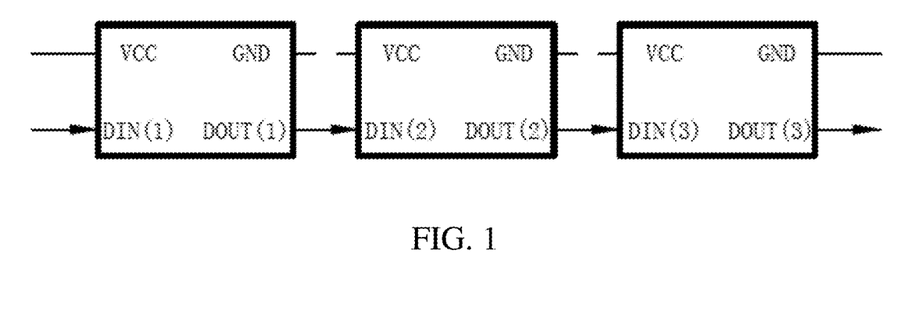
FIG. 1 is a schematic diagram of three integrated circuit chips with data lines connected in cascade.

A first magnetic induction integrated circuit chip includes a data information input pin DIN (1) and a data information output pin DOUT (1), a second magnetic induction integrated circuit chip includes a data information input pin DIN (2) and a data information output pin DOUT (2), and a third magnetic induction integrated circuit chip includes a data information input pin DIN (3) and a data information output pin DOUT (3).

Figure 2:
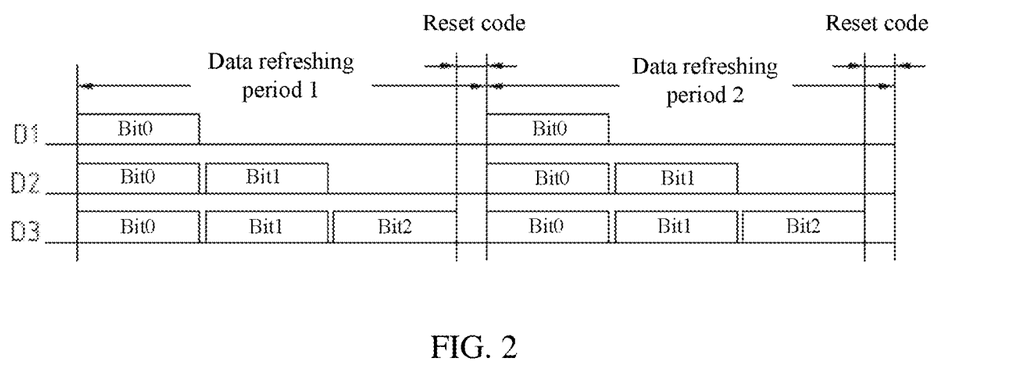
FIG. 2 is a schematic diagram showing three integrated circuit chips with data lines using a single-key bit accumulation method for code transmission.

As shown in FIG. 1, the three magnetic induction integrated circuit chips are connected in cascade. As shown in FIG. 2, the magnetic induction integrated circuit chip adopts a bit accumulation method to transmit the key information internally. The magnetic induction integrated circuit chip cooperates with a key with a magnetic element to obtain the key information. The encoding method of the magnetic induction integrated circuit chip adopts a return-to-zero code method. The working principle of the magnetic induction integrated circuit chip is as follows. A low-level reset code (several tens of microseconds in duration) is sent from the MCU to the pin DIN (1) to start the data transmission. At this time, the first magnetic induction integrated circuit chip is not affected by the corresponding key magnet, thus, a code of bit0=0 is transmitted to the pin DIN (2) through the pin DOUT (1); the second magnetic induction integrated circuit chip is not affected by the corresponding key magnet, thus, a code of bit1=0 is transmitted to the pin DIN (3) through the pin DOUT (2); the third magnetic induction integrated circuit chip is affected by the corresponding key magnet, thus, a code of bit3=1 is transmitted to the MCU through the pin DOUT (3). The third magnetic induction integrated circuit chip then transmits the codes of bit0=0, bit1=0 bit2=1 to the MCU through the pin DOUT (3). Thus, based on the codes of bit0=0, bit1=0, and bit2=1, the MCU determines that the first key is not pressed, the second key is not pressed, and the third key is pressed. Then the MCU restarts the reset code to read the three keys. If an interval between the restart of the reset code and the last start of the reset code by the MCU is 200 microseconds, then each magnetic induction integrated circuit chip sleeps for 200 microseconds after working for tens of microseconds. Similarly, if the interval between the restart of the reset code and the last start of the reset code by the MCU is 10 milliseconds, then each magnetic induction integrated circuit chip sleeps for 10 milliseconds after working for tens of microseconds. In this way, the MCU can freely and conveniently control a power consumption of the magnetic induction integrated circuit chip by changing the period of the code transmission. The longer the sleep time, the lower the power consumption of the magnetic induction integrated circuit chip. In order to save transmission time, each magnetic induction integrated circuit chip with rewrite data while transmitting information.

Figure 3:
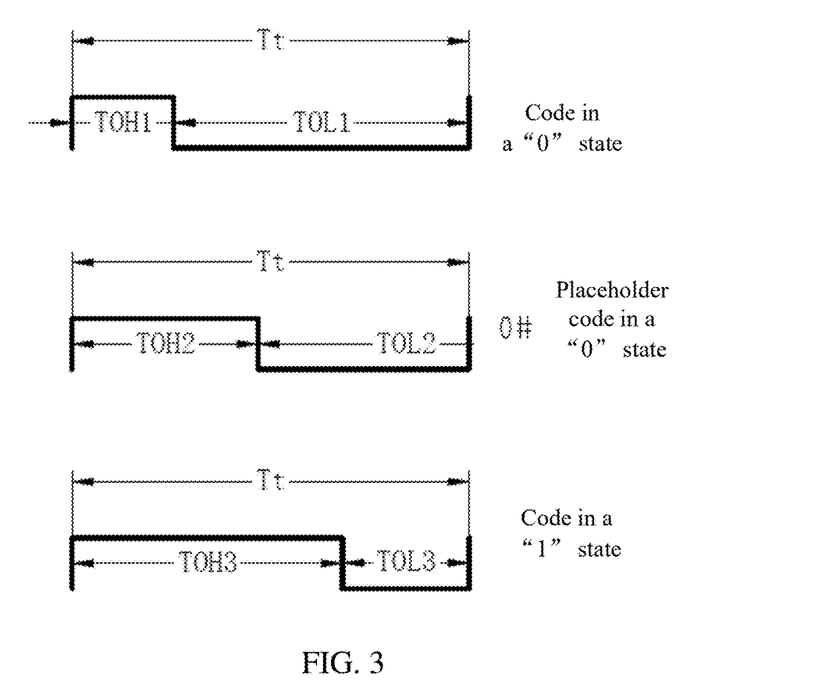
FIG. 3 is a schematic diagram of an encoding process of FIG. 2.

As shown in FIG. 3, each key corresponds to a bit, and each bit corresponds to a unipolar return-to-zero code. An initial code in a "0" state of the key is set to be high level for about 25% of the whole period, which means that TOH1 is close to ⅕ of the whole period. If the key is not pressed, a placeholder code of the key is adjusted in an "0" state, which is high level for slightly less than 50% of the whole period, that is, TOH2 is close to ½ of the whole period. If the key is pressed, the key code is adjusted to be in a "1" state, which is high level for about 66% of the whole period, that is, TOH3 is close to ⅔ of the whole period.

Embodiment 2

Figure 4:
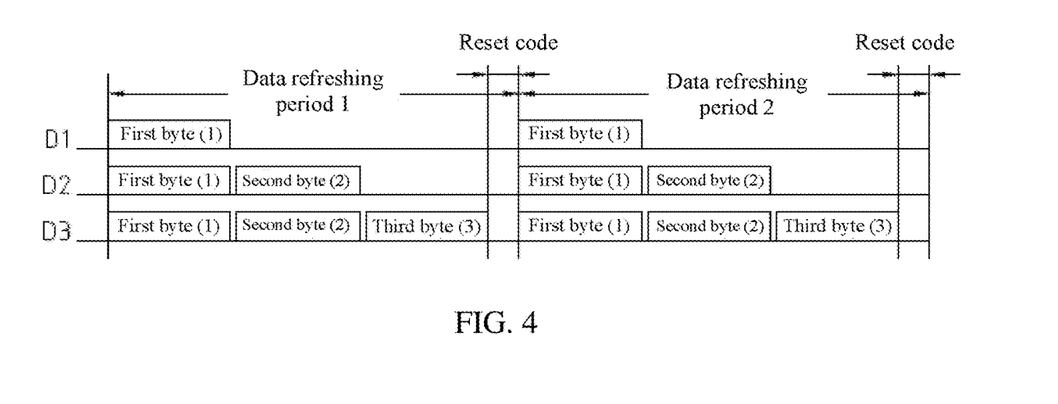
FIG. 4 is a schematic diagram showing three integrated circuit chips with data lines using a full-key bit overall method for code transmission.

An integrated circuit chip with data line according to Embodiment 2 includes a magnetic induction integrated circuit chip with data line. Different from Embodiment 1, as shown in FIG. 4, the code transmission method of the magnetic induction integrated circuit chip in Embodiment 2 adopts a full-key bit overall code transmission method.

The following explanation is based on three keys as an example. The same principle applies to multiple keys, which is not repeated hereinafter.

The pin definition and connection method of the three magnetic induction chips are the same as those in Embodiment 1. The encoding rule is also the same as that of Embodiment 1.

The magnetic induction integrated circuit chip adopts a bit overall transmission method to transmit the key information. The encoding method of the magnetic induction integrated circuit chip adopts a return-to-zero code method. The MCU starts a low-level reset code and directly writes three 0 codes, that is, the MCU transmits bit0=0, bit1=0, and bit2=0 to the pin DIN (1) of the first magnetic induction integrated circuit chip. At this time, the first magnetic induction integrated circuit chip is not affected by the corresponding key magnet, thus, bit0=0 # (0 # represents a placeholder code in an "0" state) is transmitted, and bit0=0 #, bit1=0, and bit2=0 are transmitted to the pin DIN (2) through the pin DOUT (1)); the second magnetic induction integrated circuit chip is not affected by the corresponding key magnet, thus, bit1=0 # (0 # represents the placeholder code in the "0" state) is transmitted, and bit0=0 #, bit1=0 #, and bit2=0 are transmitted to the pin DIN (3) through the pin DOUT (2); the third magnetic induction integrated circuit chip is affected by the corresponding key magnet, thus, bit2=1, and bit0=0 #, bit1=0 #, and bit2=1 are transmitted to the MCU through the pin DOUT (3). In order to save the transmission time, each magnetic induction integrated circuit chip can rewrite data while transmitting information, the placeholder code in the "0" state, that is, 0 # indicates that the key is not pressed and the sequence information of the corresponding key is not occupied, ensuring accurate sorting of the key information; the placeholder code in an "1" state indicates that the key is pressed and the sequence information of the corresponding key is occupied. Then the MCU restarts the reset code to read the information of the three keys. If the interval between the restart of the reset code by the MCU and the last start of the reset code is 200 microseconds, then each magnetic induction integrated circuit chip sleeps for 200 microseconds after working for tens of microseconds. Similarly, if the interval between the restart of the reset code by the MCU and the last start of the reset code is 10 milliseconds, then each magnetic induction integrated circuit chip sleeps for 10 milliseconds after working for tens of microseconds. In this way, the MCU can freely and conveniently control the power consumption of the magnetic induction integrated circuit chip by changing the code transmission period. The longer the sleep time, the lower the power consumption of the magnetic induction integrated circuit chip.

Embodiment 3

Figure 5:
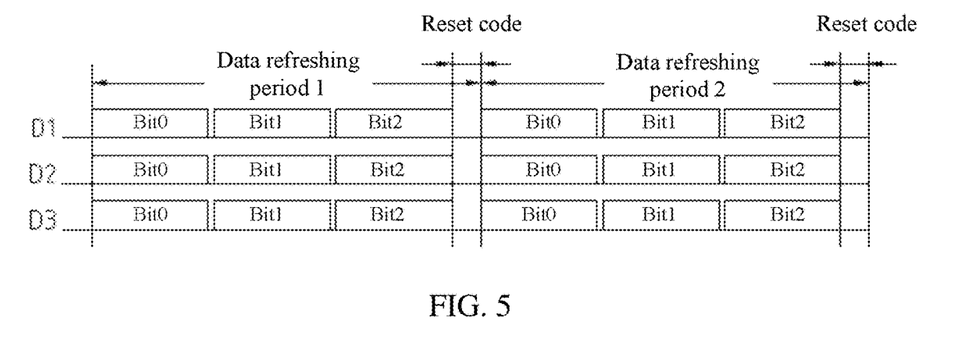
FIG. 5 is a schematic diagram showing three integrated circuit chips with data lines using a single-key byte accumulation method for code transmission.

An integrated circuit chip with data line according to Embodiment 3 includes one magnetic induction integrated circuit chip. Different from Embodiment 1, as shown in FIG. 5, the code transmission method of the magnetic induction integrated circuit chip in Embodiment 3 adopts a single-key byte accumulation transmission method.

The following explanation is based on three keys as an example. The same principle applies to multiple keys, which is not repeated hereinafter.

The pin definition and connection method of the three magnetic induction chips are the same as in Embodiment 1.

Figure 6:
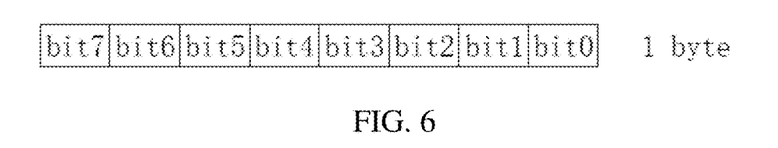
FIG. 6 is a schematic diagram showing a composition of a byte of FIG. 5.

The magnetic induction integrated circuit chip adopts a byte accumulation method to transmit the key information. The encoding method of the magnetic induction integrated circuit chip adopts the return-to-zero code method. As shown in FIG. 6, one byte represents all the information of a key. One byte is usually an integer multiple of 8 bits. Taking 1 byte=8 bits as an example, bit0 is defined to represent a working frequency of the magnetic induction integrated circuit chip, bit0=0 is defined to indicate a low-frequency working mode of the magnetic induction integrated circuit chip, and bit0=1 is defined to indicate a high-frequency working mode of the magnetic induction integrated circuit chip. The high-frequency and low-frequency working mode determine the power consumption of the magnetic induction integrated circuit chip. Bit1, bit2, bit3, bit4, bit5, bit6, and bit7 represent the key information. If the magnetic induction integrated circuit chip is a linear magnetic induction integrated circuit chip, bit1, bit2, bit3, bit4, bit5, bit6, and bit7 represents voltage digital code information of the key: bit1=1, bit2=1, bit3=1, bit4=1, bit5=1, bit6=1, and bit7=1 represent a maximum voltage of the key, bit1=0, bit2=0, bit3=0, bit4=0, bit5=0, bit6=0, and bit7=0 represent a minimum voltage of the key. If the magnetic induction integrated circuit chip is a nonlinear magnetic induction integrated circuit chip, then bit1=0, bit2=0, bit3=0, bit4=0, bit5=0, bit6=0, and bit7 represents the key information, wherein bit7=0 indicates that the key is not pressed, and bit7=1 indicates that the key is pressed.

The working principle of the magnetic induction integrated circuit chip is as follows.

A low-level reset code (several tens of microseconds in duration) is transmitted from the MCU to the pin DIN (1) of the first magnetic induction integrated circuit chip to start data transmission. At this time, the first magnetic induction integrated circuit chip writes all the information of the key into a corresponding bit of a first byte (1), and the first magnetic induction integrated circuit chip transmits the first byte (1) to the pin DIN (2) of the second magnetic induction integrated circuit chip through the pin DOUT (1). The second magnetic induction integrated circuit chip writes all the information of the key into a corresponding bit of a second byte (2), and the second magnetic induction integrated circuit chip transmits the first byte (1) and the second byte (2) to the pin DIN (3) of the third magnetic induction integrated circuit chip through the pin DOUT (1). The third magnetic induction integrated circuit chip writes all the information of the key into a corresponding bit of a third byte (3), and the third magnetic induction integrated circuit chip transmits the first byte (1), the second byte (2), and the third byte (3) to the MCU through the pin DOUT (3). In order to save the transmission time, each magnetic induction integrated circuit chip with data line can rewrite data while transmitting information.

Embodiment 4

Figure 7:
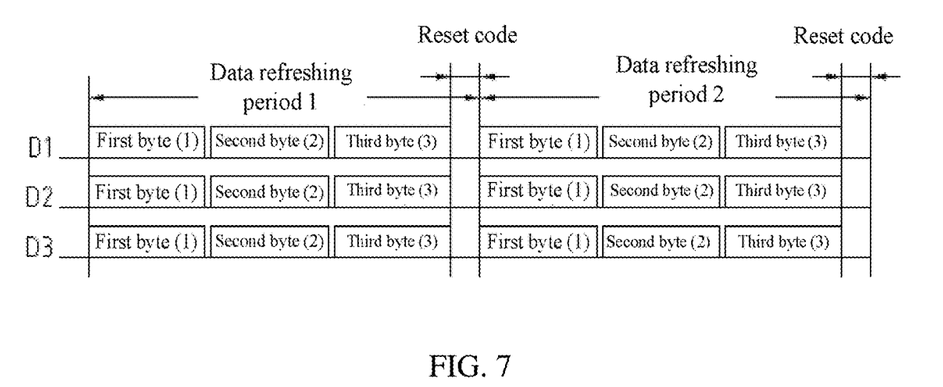
FIG. 7 is a schematic diagram showing three integrated circuit chips with data lines using a full-key byte overall method for code transmission.

An integrated circuit chip with data line according to Embodiment 4 includes one magnetic induction integrated circuit chip. Different from Embodiment 1, as shown in FIG. 7, the code transmission method of the magnetic induction integrated circuit chip in Embodiment 4 adopts a full-key byte overall code transmission method.

The following explanation is based on three keys as an example. The same principle applies to multiple keys, which is not repeated hereinafter.

The pin definition and connection method of the three magnetic induction chips are the same as in Embodiment 1.

The magnetic induction integrated circuit chip adopts a byte overall code transmission method to transmit the key information. The encoding method of the magnetic induction integrated circuit chip adopts the return-to-zero code method. One byte represents all the information of a key, and one byte is generally an integer multiple of 8 bits. Taking 1 byte=8 bits as an example, bit0 is defined to represent the placeholder code of the magnetic induction integrated circuit chip. When the first byte (1) is transmitted to the first magnetic induction integrated circuit chip, bit0 of the first byte (1) is set to 1, that is, bit0=1, which indicates that the first byte (1) of the first magnetic induction integrated circuit chip is occupied. In this way, the first byte (1) represents first key information. When the second byte (2) is transmitted to the second magnetic induction integrated circuit chip, bit0 of the second byte (2) is set to 1, that is, bit0=1, which indicates that the second byte (2) of the second magnetic induction integrated circuit chip is occupied. In this way, the second byte (2) represents second key information. When the third byte (3) is transmitted to the third magnetic induction integrated circuit chip, bit0 of the third byte (3) is set to 1, that is, bit0=1, which indicates that the third byte (3) of the third magnetic induction integrated circuit chip is occupied. In this way, the third byte (3) represents third key information, and so on. Bit1 is defined to represent the working frequency of the magnetic induction integrated circuit chip, and bit1=1 is defined to indicate a high-frequency working mode of the magnetic induction integrated circuit chip, and bit1=0 is defined to indicate a low-frequency working mode of the magnetic induction integrated circuit chip. The high-frequency and low-frequency working modes determine the power consumption of the magnetic induction integrated circuit chip. Bit2, bit3, bit4, bit5, bit6, and bit7 represent the key information. If the magnetic induction integrated circuit chip is a linear magnetic induction integrated circuit chip, and bit2, bit3, bit4, bit5, bit6, and bit7 represent key voltage digital code information of the key: bit2=1, bit3=1, bit4=1, bit5=1, bit6=1, and bit7=1 represent the maximum voltage of the key, bit1=0, bit2=0, bit3=0, bit4=0, bit5=0, bit6=0, and bit7=0 represent the minimum voltage of the key. If the magnetic induction integrated circuit chip is a nonlinear magnetic induction integrated circuit chip, then bit1=0, bit2=0, bit3=0, bit4=0, bit5=0, bit6=0, and bit7 represent the key information, wherein bit7=0 indicates that the key is not pressed, and bit7=1 indicates that the key is pressed.

The working principle of the magnetic induction integrated circuit chip is as follows.

A low-level reset code (several tens of microseconds in duration) is transmitted from the MCU to the pin DIN (1) of the first magnetic induction integrated circuit chip to start the data transmission, and the first byte (1), the second byte (2), and the third byte (3) are transmitted in sequence. At this time, the first magnetic induction integrated circuit chip writes all information of the key into the corresponding bit of the first byte (1), wherein the placeholder code bit0=1 and bit1 can be set to 0 or 1 according to the settings of the MCU. Bit2, bit3, bit4, bit5, bit6, and bit7 are set according to the actual key information, and the second byte (2) and the second third byte (3) are transmitted according to the settings of the MCU without any processing.

When the first byte (1), the second byte (2), and the third byte (3) are transmitted to the second magnetic induction integrated circuit chip, the first byte (1) is sampled and held, and the second magnetic induction integrated circuit chip writes all the information of the key into the corresponding bit of the second byte (2), wherein the placeholder code bit0=1, bit1 can be set to be 0 or 1 according to the settings of the MCU, bit2, bit3, bit4, bit5, bit6, and bit7 are set according to the actual key information, and the third byte (3) is transmitted according to the settings of the MCU without any processing.

When the first byte (1), the second byte (2), and the third byte (3) are transmitted to the third magnetic induction integrated circuit chip, the first byte (1) and the second byte (2) are sampled and held, and the third magnetic induction integrated circuit chip writes all the information of the key into the corresponding bit of the third byte (3), wherein the placeholder code bit0=1, bit1 can be set to be 0 or 1 according to the settings of the MCU, and bit2, bit3, bit4, bit5, bit6, and bit7 are set according to the actual key information. The third magnetic induction integrated circuit chip transmits the first byte (1), the second byte (2), and the third byte (3) to the MCU through the pin DOUT (3).

In order to save the transmission time, each magnetic induction integrated circuit chip can rewrite data while transmitting information.

Embodiment 5

An integrated circuit chip with data line according to Embodiment 5 integrates a magnetic induction integrated circuit and a RGB color driving circuit.

The integrated circuit chip includes a power supply pin, a ground pin, a data information input pin, and a data information output pin. The power supply pin is configured to supply power to the integrated circuit chip, and the ground pin is configured for signal grounding and power grounding. The data information output pin of the integrated circuit chip is connected to the data information input pin of an adjacent next integrated circuit chip, and the data information input pin of the integrated circuit chip is connected to the data information output pin of an adjacent previous integrated circuit chip. The data information input pins and the data information output pins of several integrated circuit chips are connected to form a data line. The several integrated circuit chips are connected in cascade and the cascaded integrated circuit chips are connected to a MCU. Each integrated circuit chip cooperates with a corresponding key with a magnetic element to obtain key information. According to different communication protocols, the RGB color driving circuit and the magnetic induction integrated circuit share the data line to transmit RGB color grayscale information and the key information in a time-sharing manner.

The following explanation is based on three keys as an example. The same principle applies to multiple keys, which is not repeated hereinafter.

Figure 8:
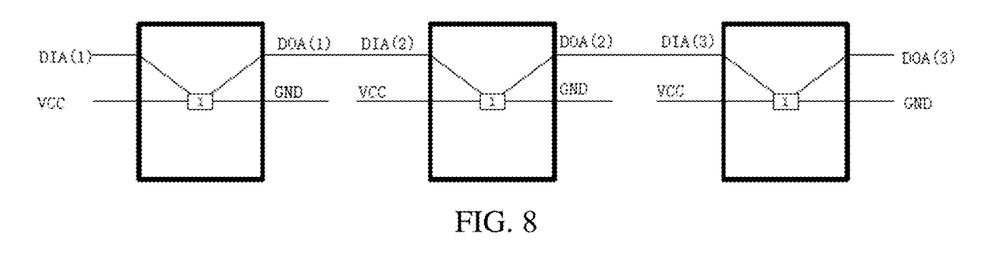
FIG. 8 is a circuit diagram of three integrated circuit chips connected in cascade corresponding to Embodiment 5, each of which integrates a magnetic induction integrated circuit and a RGB color driving circuit.

The three integrated chips are connected in cascade. The integrated circuit chip integrates the magnetic induction integrated circuit and the RGB color driving circuit. The integrated circuit chip includes the power supply pin, the ground pin, the data information input pin, and the data information output pin. The power supply pin is configured to supply power to the integrated circuit chip, and the ground pin is configured for signal grounding and power grounding. The RGB color driving circuit and the magnetic induction circuit share the data information input pin and the data information output pin.

As shown in FIG. 8, a first integrated circuit chip includes a data information input pin DIA (1) and a data information output pin DOA (1), a second integrated circuit chip includes a data information input pin DIA (2) and a data information output pin DOA (2), and a third integrated circuit chip includes a data information input pin DOA (3) and a data information output pin DOA (3).

Figure 9:
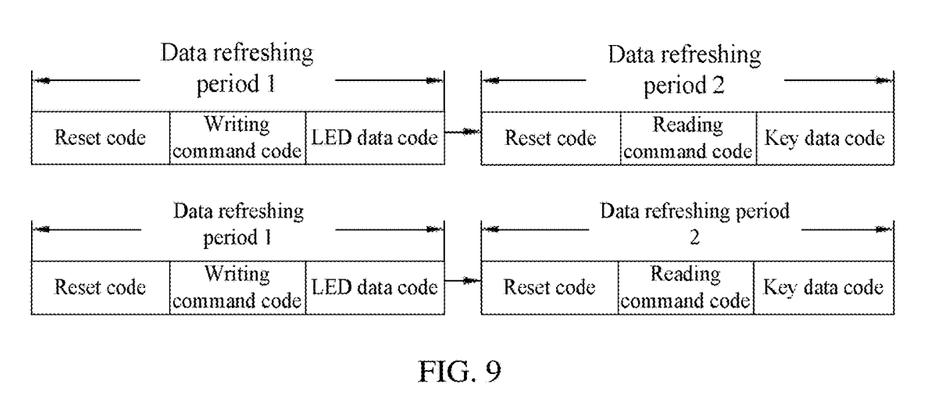
FIG. 9 is a schematic diagram showing that RGB color driving circuit data information and magnetic induction circuit data information are transmitted in a time-sharing manner corresponding to Embodiment 5.

As shown in FIG. 9, the following communication protocol is adopted in this embodiment: a LED data code and a key data code of the RGB color driving circuit are transmitted in a time-sharing manner according to the reading command and the writing command. The RGB color driving circuit writes the LED data code and the key data code to the data line, and the magnetic induction circuit reads the LED data code and the key data code from the data line. The magnetic induction integrated circuit cooperates with a button with a magnetic element to obtain the key information and form the key data code. The biggest advantage of time-sharing transmission is that the frequency of obtaining key information codes can be increased and the response speed of the key can be improved.

Embodiment 6

An integrated circuit chip with data line according to Embodiment 6 integrates a magnetic induction integrated circuit and a RGB color driving circuit.

The integrated circuit chip includes a power supply pin, a ground pin, a first data information input pin, a first data information output pin, a second data information input pin, and a second data information output pin. The power supply pin is configured to supply power to the integrated circuit chip, and the ground pin is configured for signal grounding and power grounding. The first data information output pin of the integrated circuit chip is connected to the first data information input pin of an adjacent next integrated circuit chip, and the first data information input pin of the integrated circuit chip is connected to the first data information output pin of an adjacent previous integrated circuit chip. A connection relationship between the second data information input pin and the second data information output pin is similar to that between the first data information input pin and the first data information output pin. The first data information input pin and the first data information output pin of the several integrated circuit chips are connected to form a first data line. The second data information input pin and the second data information output pin of the several integrated circuit chips are connected to form a second data line. The several integrated circuit chips are connected in cascade and the cascaded integrated circuit chips are connected to a MCU. Each integrated circuit chip cooperates with a key with a magnetic element to obtain key information. According to different communication protocols, several pieces of the key information are transmitted through the first data line, and RGB color grayscale information is transmitted through the second data line.

The following explanation is based on three keys as an example. The same principle applies to multiple keys, which is not repeated hereinafter.

Figure 10:
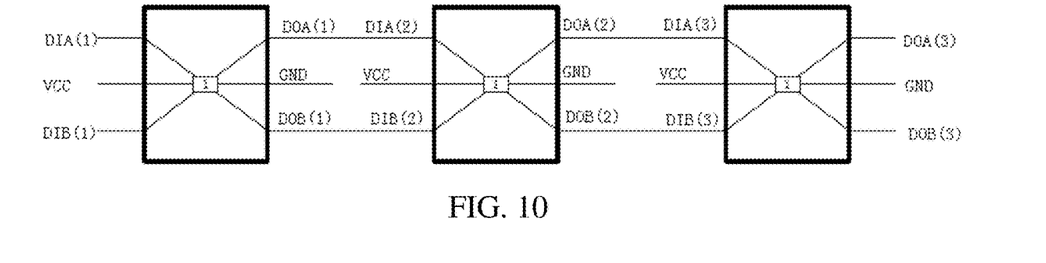
FIG. 10 is a circuit diagram of three integrated circuit chips connected in cascade corresponding to Embodiment 6, each of which integrates a magnetic induction integrated circuit and a RGB color driving circuit.

As shown in FIG. 10, three integrated chip levels are connected in cascade, and the integrated circuit chip integrates the magnetic induction integrated circuit and the RGB color driving circuit. The integrated circuit chip includes the power supply pin, the ground pin, a RGB color driving circuit data information input pin, a RGB color driving circuit data information output pin, a magnetic induction circuit data information input pin, and a magnetic induction circuit data information output pin. The power supply pin is configured to supply power to the integrated circuit chip, and the ground pin is configured for signal grounding and power grounding. The RGB color driving circuit and the magnetic induction integrated circuit have independent data information channels, allowing the RGB color driving circuit and the magnetic induction integrated circuit to work simultaneously without affecting each other, further improving the work efficiencies of the RGB color driving circuit and the magnetic induction integrated circuit.

Figure 11:
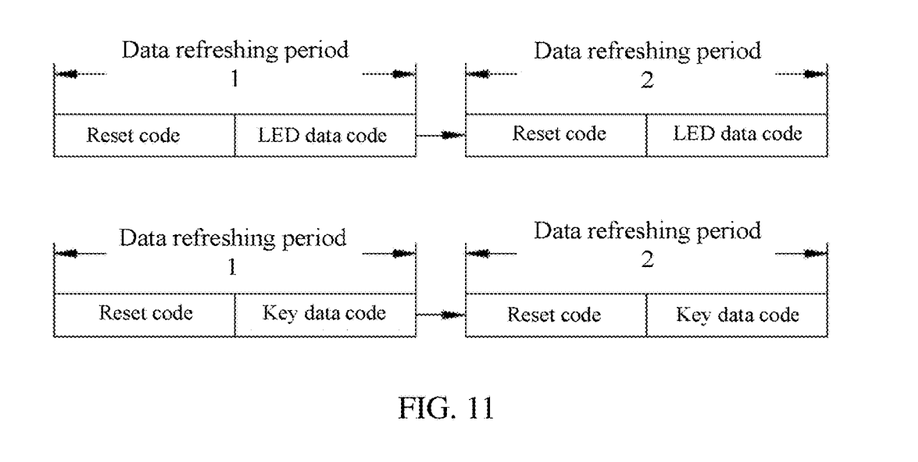
FIG. 11 is a schematic diagram showing that the RGB color driving circuit data information and the magnetic induction circuit data information are transmitted simultaneously corresponding to Embodiment 6.

As shown in FIG. 11, the magnetic induction integrated circuit of a first integrated circuit chip includes a data information input pin DIA (1) and a data information output pin DOA (1), the magnetic induction integrated circuit of a second integrated circuit chip includes a data information input pin DIA (2) and a data information output pin DOA (2), and the magnetic induction integrated circuit of a third integrated circuit chip includes a data information input pin DIA (3) and a data information output pin DOA (3).

The RGB color driving circuit of the first integrated circuit chip includes a data information input pin DIB (1) and a data information output pin DOB (1), the RGB color driving circuit of the second integrated circuit chip includes a data information input pin DIB (2) and a data information output pin DOB (2), and the RGB color driving circuit of the third integrated circuit chip includes a data information input pin DIB (3) and a data information output pin DOB (3).

Embodiment 7

An integrated circuit chip with data line according to Embodiment 7 includes a magnetic induction integrated circuit chip and a RGB color driving circuit chip. The magnetic induction integrated circuit chip includes a power supply pin, a ground pin, a first data information input pin, and a first data information output pin. The power supply pin is configured to supply power to the magnetic induction integrated circuit chip, and the ground pin is configured for signal grounding and power grounding. The data information output pin of the magnetic induction integrated circuit chip is connected to the data information input pin of an adjacent next magnetic induction integrated circuit chip, and the data information input pin of the magnetic induction integrated circuit chip is connected to the data information output pin of an adjacent previous magnetic induction integrated circuit chip. The data information input pins and the data information output pins of several integrated circuit chips are connected to form a first data line. The several magnetic induction integrated circuit chips are connected in cascade and the cascaded magnetic induction integrated circuit chips are connected to a MCU. Each magnetic induction integrated circuit chip cooperates with a key with a magnetic element to obtain key information. According to different communication protocols, several pieces of the key information are transmitted through the first data line.

The RGB color driving circuit chip shares the power supply pin and ground pin of the magnetic induction integrated circuit chip. The RGB color driving circuit chip further includes a second data information input pin and a second data information output pin, and a connection relationship between the second data information input pin and the second data information output pin is similar to that between the first data information input pin and the first data information output pin.

The second data information output pin of the RGB color driving circuit chip is connected to the second data information input pin of an adjacent next RGB color driving circuit chip, and the second data information input pin of the RGB color driving circuit chip is connected to the second data information output pin of an adjacent previous RGB color driving circuit chip. The data information input pin and the data information output pin of several RGB color driving circuit chips are connected to form a second data line. The several RGB color driving circuit chips are connected in cascade and the cascaded RGB color driving circuit chips are connected to the MCU. According to different communication protocols, several pieces of RGB color grayscale information are transmitted through the second data line.

The following explanation is based on three keys as an example. The same principle applies to multiple keys, which is not repeated hereinafter.

Figure 12:
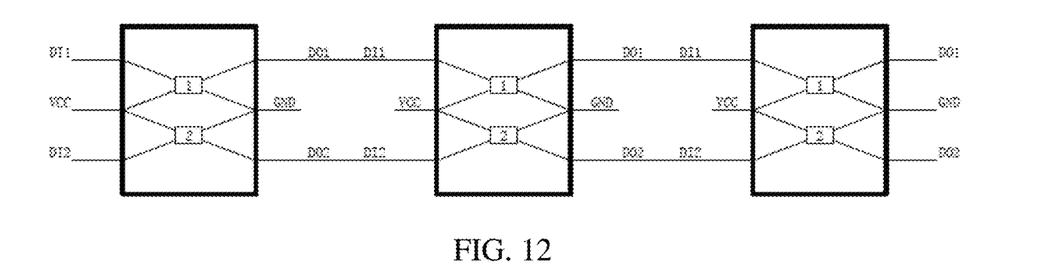
FIG. 12 is a circuit diagram of three integrated circuit chips connected in cascade corresponding to Embodiment 7, each of which includes a magnetic induction integrated circuit chip and a RGB color driving circuit chip physically packaged together.

As shown in FIG. 12, three integrated chips are connected in cascade. The integrated circuit chip includes the magnetic induction integrated circuit chip 1 and the RGB color driving circuit chip 2. The magnetic induction integrated circuit chip 1 and the RGB color driving circuit chip 2 are physically stacked using a LED packaging process, such that the magnetic induction integrated circuit chip 1 and the RGB color driving circuit chip 2 can share the power supply pin VCC and the ground pin GND. The magnetic induction integrated circuit chip 1 has data lines DI1 and DO1, and the magnetic induction integrated circuit chip 1 transmits data through the data lines DI1 and DO1. The RGB color driving circuit chip 2 has data lines DI2 and DO2, and the RGB color driving circuit chip 2 transmits data using the data lines DI2 and DO2. In this way, two different chips are packaged together in form using the LED packaging process such that the two different chips can share the power supply pin VCC and the ground pin GND, thereby reducing the number of pins and the volume of the finished chip, and reducing the cost.

In Embodiments 1 to 7, the magnetic induction integrated circuit chip is a Hall integrated circuit chip, and the magnetic induction integrated circuit is a Hall integrated circuit. The Hall integrated circuit chip and the Hall integrated circuit can be a linear Hall or a nonlinear Hall. The magnetic induction integrated circuit chip can also be other chips such as magneto-resistive integrated circuit chips, and the magnetic induction integrated circuit can also be other circuits such as magneto-resistive integrated circuits.

A key includes a key body. The key body includes an upper shell, a lower shell, and a press handle, the upper shell is fixedly connected to the lower shell, the press handle is arranged on the upper shell and is moveable up and down. A receiving space is formed between the upper shell and the lower shell. An elastic element is arranged in the receiving space and is located below the press handle. The key further includes a magnetic element and a magnetic induction element. The magnetic element is fixed on the press handle and moves up and down with the press handle, the magnetic induction element includes an integrated circuit chip in the above Embodiments 1 to 7. The magnetic induction element is arranged on a printed circuit board, and the magnetic element is arranged correspondingly to the magnetic induction element.

A mechanical keyboard includes a printed circuit board with a single-chip microcomputer mounted on the printed circuit board and several aforementioned keys.

The integrated circuit chip in Embodiments 5 and 6 can respectively include one or two of the power supply pins.

When there is only one power supply pin, the magnetic induction integrated circuit and the RGB color driving circuit share the power supply pin for power supply.

Figure 13:
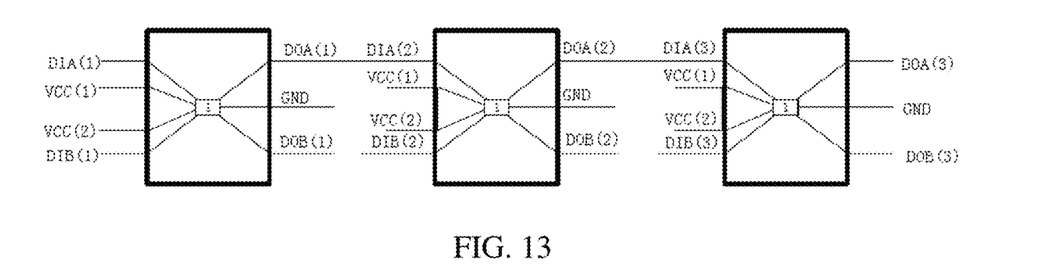
FIG. 13 is a circuit diagram of three integrated circuit chips connected in cascade corresponding to Embodiment 5, each of which includes two power supply pins and integrates a magnetic induction integrated circuit and a RGB color driving circuit.

As shown in FIG. 13, when there are two power supply pins, the magnetic induction integrated circuit and the RGB color driving circuit each use one independent power supply pin for power supply.

In FIGS. 2, 4, 5, and 7, D1, D2, and D3 are three integrated circuit chips with data lines.

In Embodiments 1 to 7, all integrated circuit chips containing RGB color driving circuits are packaged using the LED packaging technology.

In Embodiments 1 to 7, the integrated circuit chip may be configured with a backup data line transmission channel. The following description is based on Embodiment 8.

Embodiment 8

Based on Embodiment 1, the integrated circuit chip in this embodiment is configured with a backup data transmission channel.

Figure 14:
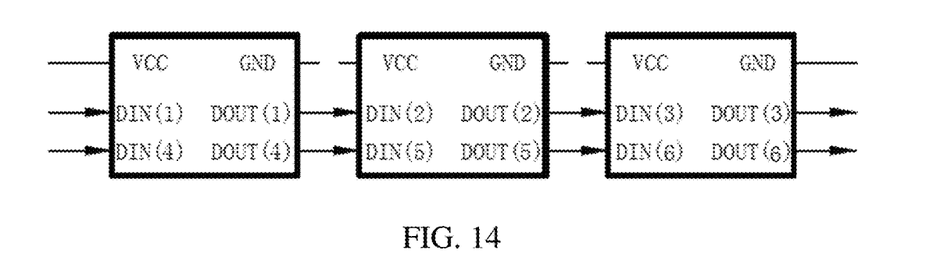
FIG. 14 is a circuit diagram of three integrated circuit chips with data lines connected in cascade according to Embodiment 8.

As shown in FIG. 14, three magnetic induction integrated circuit chips with data lines are connected in cascade, and the cascaded circuit has two data lines with dual data path communication capabilities. When the two data transmission channels receive valid data information simultaneously, the data line formed by the pin DIN (1), the pin DOUT (1), the pin DIN (2), the pin DOUT (2), the pin DIN (3), and the pin DOUT (3) is considered as the data transmission channel, and the operation status of the data transmission channel is detected regularly. If the data line is detected to be in an off state for a duration greater than a set value (such as several milliseconds), the data line formed by the pin DIN (4), the pin DOUT (4), the pin DIN (5), the pin DOUT (5), the pin DIN (6) pin, and the pin DOUT (6) is automatically used as the data transmission channel. At this time, the data line acts as a backup data transmission channel, greatly improving the reliability of system operation.

It is understandable that the above-mentioned technical features may be used in any combination without limitation. The above descriptions are only the embodiments of the present disclosure, which do not limit the scope of the present disclosure. Any equivalent structure or equivalent process transformation made by using the content of the description and drawings of the present disclosure, or directly or indirectly applied to other related technologies in the same way, all fields are included in the scope of patent protection of the present disclosure.

What is claimed is:

1. An integrated circuit chip with data line, wherein the integrated circuit chip comprises a magnetic induction integrated circuit and a RGB color driving circuit;

the integrated circuit chip comprises a power supply pin, a ground pin, a data information input pin, and a data information output pin; the power supply pin is configured to supply power to the integrated circuit chip, and the ground pin is configured for signal grounding and power grounding; the data information output pin is connected to the data information input pin of an adjacent next integrated circuit chip, and the data information input pin is connected to the data information output pin of an adjacent previous integrated circuit chip; the data information input pins and the data information output pins of several integrated circuit chips are connected to form a data line; the several integrated circuit chips are connected in cascade and the cascaded integrated circuit chips are connected to a MCU; each of the integrated circuit chips cooperates with a corresponding key with a magnetic element to obtain key information; according to different communication protocols, the RGB color driving circuit and the magnetic induction integrated circuit share the data line to transmit RGB color grayscale information and the key information in a time-sharing manner.

2. An integrated circuit chip with data line, wherein the integrated circuit chip is a magnetic induction integrated circuit chip, and the magnetic induction integrated circuit chip comprises a power supply pin, a ground pin, a data information input pin, and a data information output pin; the power supply pin is configured to supply power to the magnetic induction integrated circuit chip, and the ground pin is configured for signal grounding and power grounding; the data information output pin is connected to the data information input pin of an adjacent next magnetic induction integrated circuit chip, and the data information input pin is connected to the data information output pin of an adjacent previous magnetic induction integrated circuit chip; several magnetic induction integrated circuit chips are connected in cascade and the cascaded magnetic induction integrated circuit chips are connected to a MCU; the data information input pins and data information output pins of the several integrated circuit chips are connected to form a data line; each of the magnetic induction integrated circuit chips cooperates with a corresponding key with a magnetic element to obtain key information, and several pieces of the key information are transmitted through the data line according to different communication protocols; and wherein a single piece of key information is transmitted bit by bit, and n keys of an entire keyboard correspond to n bits of information; the n bits of information and reset information form a period of the key information; a working frequency of each magnetic induction integrated circuit chip is adjusted according to a period during which the MCU reads all the key information.

3. The integrated circuit chip with data line according to claim 2, wherein the MCU sends a n-bit code corresponding to n magnetic induction integrated circuit chips at one time, and the n-bit code passes through the n keys in turn; each key corresponds to a bit of the n-bit code, and each bit corresponds to a unipolar return-to-zero code, and an initial code in a "0" state of the key is set to be high level in a whole period and be not greater than a first set value; when the n-bit code passes through a key and the key is not pressed, a placeholder code of the key is adjusted to be in a "0" state which is high level in the whole period and is not greater than a second set value and greater than the first set value; when the key is pressed, the placeholder code of the key is adjusted to be in a "1" state, which is high level in the whole period and is greater than a third set value, and the third set value is greater than the second set value; or, after the MCU sends a reset code, the several pieces of the key information are transmitted in an accumulative manner until the several pieces of the key information is transmitted to the MCU.

4. The integrated circuit chip with data line according to claim 2, wherein a single piece of the key information is transmitted in one byte, and the single piece of the key information includes x bits of synchronization information, y bits of working frequency information of the magnetic induction integrated circuit chip, and z bits of key voltage information; a sum of x bits, y bits, and z bits is one byte; the key voltage information is continuous voltage information or digital voltage values;

n keys of an entire keyboard correspond to n bytes of information, and the n bytes of information and the reset information form a period of the key information.

5. The integrated circuit chip with data line according to claim 4, wherein after the MCU sends a reset code, several pieces of the key information are transmitted in an accumulation manner until the several pieces of the key information are transmitted to the MCU;

or, the MCU sends out a n-byte code corresponding to n magnetic induction integrated circuit chips at a time, and the n-byte code passes through the n keys in turn; each key corresponds to a byte, and each bit in the byte corresponds to a unipolar return-to-zero code.

6. The integrated circuit chip with data line according to claim 2, wherein the integrated circuit chip comprises one or two of the power supply pins.

7. The integrated circuit chip with data line according to claim 2, wherein the integrated circuit chip is provided with a backup data line transmission channel.

8. A key, comprising a key body, the key body comprising an upper shell, a lower shell fixedly connected to the upper shell, and a press handle being arranged on the upper shell and moveable up and down, a receiving space being formed between the upper shell and the lower shell, an elastic element being arranged in the receiving space, the elastic element being located below the press handle, wherein the key further comprises a magnetic element and a magnetic induction element, the magnetic element is fixed on the press handle and moves up and down with the press handle, the magnetic induction element comprises the integrated circuit chip with data line according to claim 1, the magnetic induction element is arranged on a printed circuit board, and the magnetic element is arranged correspondingly to the magnetic induction element.

9. A mechanical keyboard, comprising a printed circuit board, a single-chip microcomputer being arranged on the printed circuit board, and a plurality of the keys according to claim 8.

10. A key, comprising a key body, the key body comprising an upper shell, a lower shell fixedly connected to the upper shell, and a press handle being arranged on the upper shell and moveable up and down, a receiving space being formed between the upper shell and the lower shell, an elastic element being arranged in the receiving space, the elastic element being located below the press handle, wherein the key further comprises a magnetic element and a magnetic induction element, the magnetic element is fixed on the press handle and moves up and down with the press handle, the magnetic induction element comprises the integrated circuit chip with data line according to claim 2, the magnetic induction element is arranged on a printed circuit board, and the magnetic element is arranged correspondingly to the magnetic induction element.

11. A mechanical keyboard, comprising a printed circuit board, a single-chip microcomputer being arranged on the printed circuit board, and a plurality of the keys according to claim 10.

12. The integrated circuit chip with data line according to claim 1, wherein a single piece of key information is transmitted bit by bit, and n keys of an entire keyboard correspond to n bits of information; the n bits of information and reset information form a period of the key information; a working frequency of each magnetic induction integrated circuit chip is adjusted according to a period during which the MCU reads all the key information.

13. The integrated circuit chip with data line according to claim 12, wherein the MCU sends a n-bit code corresponding to n magnetic induction integrated circuit chips at one time, and the n-bit code passes through the n keys in turn;

each key corresponds to a bit of the n-bit code, and each bit corresponds to a unipolar return-to-zero code, and an initial code in a "0" state of the key is set to be high level in a whole period and be not greater than a first set value; when the n-bit code passes through a key and the key is not pressed, a placeholder code of the key is adjusted to be in a "0" state which is high level in the whole period and is not greater than a second set value and greater than the first set value; when the key is pressed, the placeholder code of the key is adjusted to be in a "1" state, which is high level in the whole period and is greater than a third set value, and the third set value is greater than the second set value;

or, after the MCU sends a reset code, the several pieces of the key information are transmitted in an accumulative manner until the several pieces of the key information is transmitted to the MCU.

14. The integrated circuit chip with data line according to claim 1, wherein a single piece of the key information is transmitted in one byte, and the single piece of the key information includes x bits of synchronization information, y bits of working frequency information of the magnetic induction integrated circuit chip, and z bits of key voltage information; a sum of x bits, y bits, and z bits is one byte; the key voltage information is continuous voltage information or digital voltage values;

n keys of an entire keyboard correspond to n bytes of information, and the n bytes of information and the reset information form a period of the key information.

15. The integrated circuit chip with data line according to claim 14, wherein after the MCU sends a reset code, several pieces of the key information are transmitted in an accumulation manner until the several pieces of the key information are transmitted to the MCU;

or, the MCU sends out a n-byte code corresponding to n magnetic induction integrated circuit chips at a time, and the n-byte code passes through the n keys in turn;

each key corresponds to a byte, and each bit in the byte corresponds to a unipolar return-to-zero code.

16. The integrated circuit chip with data line according to claim 1, wherein the integrated circuit chip comprises one or two of the power supply pins.

17. The integrated circuit chip with data line according to claim 1, wherein the integrated circuit chip is provided with a backup data line transmission channel.

* * * * *